United States Patent [19]

Foss

[11] Patent Number: 5,208,428
[45] Date of Patent: May 4, 1993

[54] SPLICE CLOSURES

[75] Inventor: Raymond C. Foss, Plymouth, United Kingdom

[73] Assignee: Bowthorpe-Hellermann Limited, Crawley, Great Britain

[21] Appl. No.: 721,429

[22] PCT Filed: Jan. 2, 1990

[86] PCT No.: PCT/GB90/00003

§ 371 Date: Jun. 28, 1991

§ 102(e) Date: Jun. 28, 1991

[87] PCT Pub. No.: WO90/07812

PCT Pub. Date: Jul. 12, 1990

[30] Foreign Application Priority Data

Jan. 5, 1989 [GB] United Kingdom ............... 8900163
Sep. 13, 1989 [GB] United Kingdom ............... 8920706

[51] Int. Cl.$^5$ ........................................... H02G 15/115
[52] U.S. Cl. ................................. 174/91; 174/77 R; 174/82; 174/93; 174/DIG. 8
[58] Field of Search .............. 174/80, 82, 87, 91, 174/77 R, 93, DIG. 8

[56] References Cited

U.S. PATENT DOCUMENTS

| | | | |
|---|---|---|---|
| 3,395,382 | 7/1968 | Weagant | 174/91 |
| 3,614,295 | 10/1971 | Gillemot et al. | 174/87 |
| 3,624,594 | 11/1971 | Trimble et al. | 174/93 X |
| 4,769,513 | 9/1988 | Ragland et al. | 174/93 X |
| 4,924,034 | 5/1990 | Truesdale et al. | 174/87 |

FOREIGN PATENT DOCUMENTS

| | | |
|---|---|---|
| 94848 | 11/1983 | European Pat. Off. . |
| 122784 | 10/1984 | European Pat. Off. . |
| 236141 | 9/1987 | European Pat. Off. . |
| 240295 | 10/1987 | European Pat. Off. . |
| 2820626 | 9/1979 | Fed. Rep. of Germany .... 174/77 R |
| 8515441 | 10/1985 | Fed. Rep. of Germany . |
| 9007812 | 7/1990 | PCT Int'l Appl. . |
| 2046030 | 11/1980 | United Kingdom ................. 174/93 |
| 1594693 | 8/1981 | United Kingdom . |

*Primary Examiner*—Morris H. Nimmo
*Attorney, Agent, or Firm*—David P. Gordon

[57] ABSTRACT

A cable splice closure base (1,2) comprises a plurality of tubular cable entry ports each having an outer portion (4) which is heat shrinkable and being closed at its inner end by a frangible membrane (28). Cables may be installed through some only of the entry ports, which are then recovered about those cables while heat shields are used to insulate the other entry ports. Further cables may be installed subsequently through the other ports and/or ports which are already used may be opened and re-used.

10 Claims, 4 Drawing Sheets

SPLICE CLOSURES

BACKGROUND OF THE INVENTION

This invention relates to a method and apparatus for sealing reopenable cable splice closures in both pressurised and non-pressurised networks.

Reopenable splice closures are used for jointing cables and for the distribution of branch cables. The closure effects environmental protection and sealing of the cable joints, which cables may be telecommunications and optical fibre cables and the joints may be between adjacent lengths of cable or at their connection to terminal accessories.

Various techniques are known for sealing reopenable splice closures. These include the use of heatshrink polymer members, self-amalgamating tapes, mechanical rubber seals and self-curing resins. One or more of these techniques are used to seal or re-seal a closure after re-entry for the maintenance of internal splices or to fit an additional cable for splicing to existing cables. The environmental sealing is carried out in two distinct areas, firstly the closure or sleeve for re-entry to the internal elements of the closure, secondly the cable entry ports.

The above techniques have various disadvantages. For example, although heatshrink members provide a seal of high performance for both unpressurised and pressurised cables over a relatively large cable range, re-entry to the closure body requires the addition of new materials at extra expense and inconvenience, and the existing cable entry ports require adequate protection from heat when recovering the heatshrink members for sealing additional cables to the entry ports. Self-amalgamating tapes require considerable care and dexterity on the part of the operator, both to ensure that adequate tape has been provided and to cover all surfaces so that even the smallest gap or moisture penetration path is avoided. Other notable disadvantages of self amalgamating tapes are (a) the inflexibility in the range of cable diameters that can be used for a single port size, (b) the ability of the tape material to move or creep with normal environmental vibration or internal air pressure particularly at elevated temperatures, and (c) the need to replace sealing tape at extra expense and inconvenience when re-entry is required to either the closure body or cable entry ports.

Mechanical rubber seals can effect a seal of high performance for both unpressurised and pressurised cables without the need for additional materials for reclosing after entry. Mechanical rubber seal clamp assemblies are typically designed with one fixing thumb screw facilitating ease and speed of re-entry. However, this technique has the disadvantages that the rubber seal is only effective if clean (a potential hazard in external use) and the seal mating faces have to be dimensionally stable (a constraint when using cables of various sizes and shapes e.g. oval).

Self curing resins provide a poor means of environmental seal over long periods of time, particularly over the life of a cable jointing closure of 20-30 years. Resins have the disadvantage that they require adequate time to cure and that the contact with skin and the fumes which are given off are potential health hazards. The notable advantage with resins over other sealing techniques is that they flow around the cables at the entry port, producing an effective barrier to gas, moisture and water and to cable grease penetration.

SUMMARY OF THE INVENTION

In accordance with this invention, there is provided a cable splice closure base which has a plurality of tubular cable entry ports projecting thereform, each tubular entry port having an axially inner portion and an axially outer portion, the outer portion being heat-shrinkable and the inner portion being closed at its inner end by a frangible membrane.

Preferably the heat-shrinkable portion of each entry port is closed at its axially outer or free end, so that each entry port is sealed both by its frangible membrane and by its heat-shrinkable portion.

Preferably the splice closure base comprises a base member of rigid construction having a plurality of tubular projections, which projections are closed at their inner ends by the frangible membranes, and a separate member which has a plurality of tubular projections which fit closely around the tubular projections of the rigid base member and are heat-shrinkable over their free end portions.

In use of this splice closure base, selected entry ports may be opened by cutting off the closed ends of their heat-shrinkable portions and then breaking off their frangible membranes. Cables can then be inserted through those ports which have been opened, and the heat-shrinkable portions of those ports recovered about the inserted cables. A heat shield used to shield from the applied heat the entry ports which are to remain in expanded or unrecovered form. This allows for the unrecovered entry ports to be opened up subsequently for the introduction of additional cables to the joint closure. If it becomes necessary to remove and replace a cable which has already been installed, the heat-recovered portion of the entry port can be cut-away and then a separate heat-shrink sleeve can be applied over the new cable and over the tubular projection of the base member.

Heatshields may be provided in tubular form for fitting over those cable entry ports which it is desired to maintain in expanded form when one or more other ports are being recovered.

Alternatively, a heatshield of e.g. V-shape or C-shape may be provided and placed about an entry port which is to be recovered, to shield adjacent ports from the heat which is to be applied to that port.

Preferably the splice closure base has a generally central tubular entry port which extends axially outwards beyond other ports which surround it. In order that this central port may be recovered without recovering the other ports, a heatshield may be provided in the form of a flat sheet having an aperture, which may be fitted to the splice closure base with the recoverable portion of the central port projecting through this aperture. Thus heat can be applied to recover this projecting portion of the central port without recovering the other ports.

Preferably a substance (e.g. a synthetic resin) is introduced into each cable entry port after it has been recovered about a cable, which substance is cured or allowed to cure so as to provide a seal. Preferably the splice closure base is formed with a plurality of compartments in register with respective entry ports.

Also in accordance with this invention there is provided a kit for forming a cable joint closure, the kit comprising a splice closure base which has a plurality of tubular entry ports projecting therefrom, tubular heat-shrinkable elements for recovering about cables when inserted through selected entry ports in order to seal those ports about the respective cables, and one or more heatshields for thermally insulating one or more entry ports from heat applied to recover the heat-shrinkable elements of one or more other entry ports.

Further in accordance with this invention, there is provided a method of forming a cable joint using a splice closure base which has a plurality of tubular entry ports projecting therefrom, comprising the step of passing cables through one or more but not all of the tubular entry ports and applying heat to one or more respective heat shrinkable elements to recover them about the cables whilst using one or more heat shields to insulate other cable entry ports from the applied heat.

Embodiments of this invention will now be described by way of examples only and with reference to the accompanying drawings.

DETAILED DESCRIPTION OF THE PREFERRED EMBODIMENT

Figure 1A:
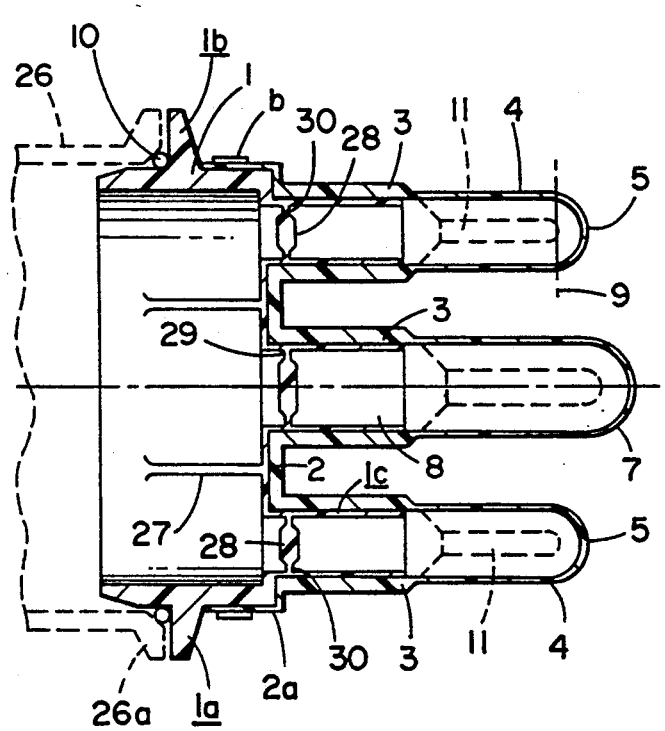
FIGS. 1A and 1B show respectively in cross-sectional and half plan views a splice closure base in the supplied condition.
Figure 1B:
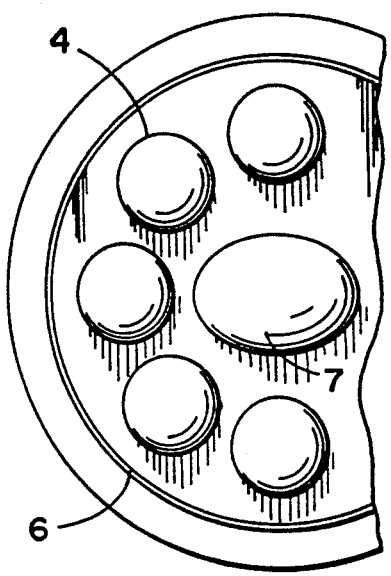

Referring to FIGS. 1A and 1B there is shown a cable splice closure base 1,2. A re-openable splice closure comprises a one-piece tubular sleeve 26 which is closed at one end (not shown) and has its other, open end fitted to the base 1,2 so as to enclose cable joints or splices. The base 1,2 has a tubular section 1a with a portion which fits within the open end of the sleeve 26 and an annular flange 1b which abuts the end of the sleeve. A radially outwardly projecting annular flange 26a at the end of sleeve 26 abuts the flange 1b of the base with the interposition of an O-ring seal 10. The sleeve 26 is held in place on the base by a split clampong ring (not shown) having a groove on its inner periphery receiving the flanges 1b, 26a.

The base comprises a base member 1 formed of heat resistant thermoset polymer and formed by injection moulding, typically by a dough compression moulding process. The outer end of the base member 1 is closed but provided with a multiplicity of tubular projections 1c. The inner end of each of these is closed by a membrane 28 having a reduced-thickness periphery as shown at e.g. 29, 30. The splice closure base further comprises a moulded member 2 having a skirt 2a which fits closely around the outside of the tubular section 1a of the base member 1, and a plurality of tubular projections 3, 4 which fit closely around the respective tubular projections 1c of the base member 1. The tubular projections 3, 4 are approximately twice as long as the projections 1c of the base member 1: the projections 3, 4 are of relatively large wall thickness for half their lengths, covering the projections 1c, and of reduced wall thickness for the remainder of their lengths 4, and are closed at their outer or free ends e.g. 5, 7. The end portions 4 are in an expanded condition so as to be heat-shrinkable, and are capable of recovering to the shape indicated at 11. The heat shrink moulded member 2 is sealed to the base member 1 using a hot melt adhesive having a melt temperature above that likely to be experienced through conduction or convection when heat is applied to the recoverable portions 4: an adhesive melt temperature above 60° is unlikely to be required. The member 2 is further held to the member 1 by a band 6 (e.g. of stainless steel or high performance polymer) tightened around the skirt 2a of member 2 and the underlying tubular section of member 1.

The base member 1 is formed with integral partition walls 27 to define individual compartments within its tubular section 1a registering with the respective tubular projections 1c.

Figure 2A:
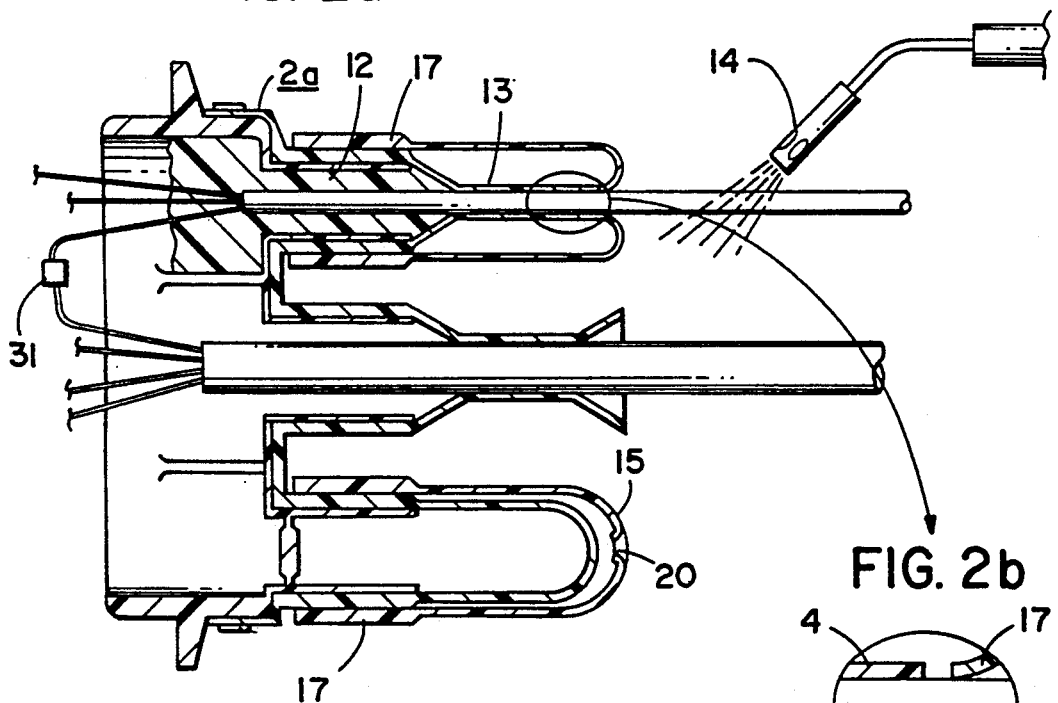
FIG. 2A is a cross-sectional view of an assembled splice closure base showing some cables installed and illustrating the process of recovering one of the cable entry ports of the base around the respective cable.
Figure 2B:
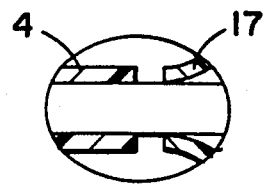
FIG. 2B is an enlarged view of the indicated portion of FIG. 2A.
Figure 3A:
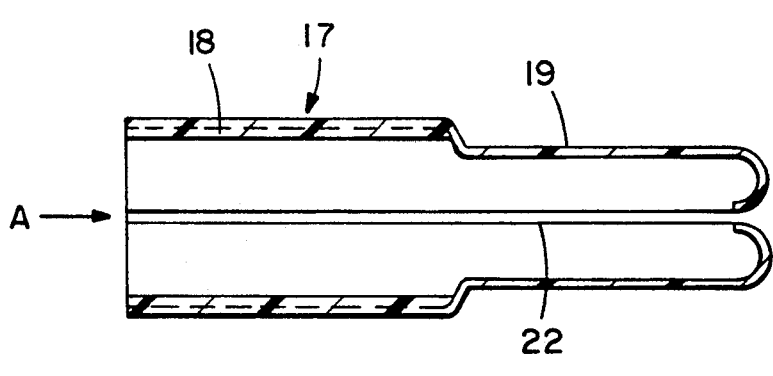
FIGS. 3A and 3B show respectively in longitudinal section and end views a tubular heat-shield for use on a cable entry port of the base.
Figure 3B:
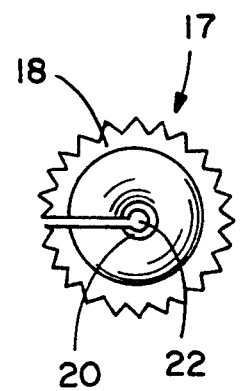

In accordance with this invention, a kit for forming the cable splice closure comprises the base 1,2, the sleeve 26 and one or more tubular heat shields 17 as shown in FIGS. 3A and 3B. Preferably this tubular heat shield comprises a ceramic fibre material capable of providing insulation against temperatures in excess of 1000° C. to ensure adequate protection for the cable entry port to which it is applied. The heatshield is cylindrical or otherwise shaped in cross-section (e.g. oval) to match the cross section of the cable entry ports. The heatshield has half of its length 18 of relatively large inner diameter to fit over the larger diameter half of the cable entry port, and half of its length 19 of reduced diameter to fit over the reduced diameter end of the cable entry port. The heatshield is closed at its outer end. A slit 22 is provided along the side of the heatshield and to the centre of its closed end to enable it to be applied to a cable entry which already has a cable installed therein, as shown in FIG. 2 at 13. The heatshield is formed with a convoluted wall as shown, to allow for expanding the heatshield to fit over the cable entry port and thus grip the latter. The rounded, closed end 15 of the heatshield is formed with an inwards deformation 20 which serves for gripping and sealing any cable around which the heatshield is applied.

In use, the splice closure is formed of the sleeve 26 and the splice closure base 1, 2 fitted into the open end of the sleeve. The base has a greater number of cable entry ports than is required for the initial cable installation, thus permitting additional or replacement cables to be installed using the free ports. FIG. 2 shows a situation where a cable 13 is already installed through one entry port and this has been recovered about the cable. Now another cable has been installed through another port and this port is being recovered about the new cable using a gas flame heating torch 14: before this torch is applied, however, heatshields 17 of FIG. 3 are fitted to the neighbouring port, as seen in FIGS. 2A and 2B, to protect them from the applied heat. Heatshields are fitted both to entry ports through which cables have already been installed, and to unused ports. Individual conductors of the cables are interconnected by splices, one of which is shown at 31.

It will be appreciated that in order to install a cable through an entry port, first the end of the port is cut off as shown at 9 in FIG. 1, e.g. using a hacksaw or suitable cutter. Then the membrane 28 is removed, e.g. by inserting a rod and striking the membrane 28 firmly so as to tear it around its thin periphery 30.

After the cable has been installed and the port has been recovered about the cable, the port and associated compartment within the base member 1 are filled with resin as shown at 12 in FIG. 2, in order to provide a seal additional to that provided by the recovered port. It will be noted that by providing such a compartment, the resin encapsulates a length of the individual conductors themselves as they emerge from the end of the cable sheath and furthermore seal the end of this sheath. Any ports which are not likely to be needed can be blanked off by filling the associated compartment with resin, without removing the corresponding membrane 28.

Figure 4:
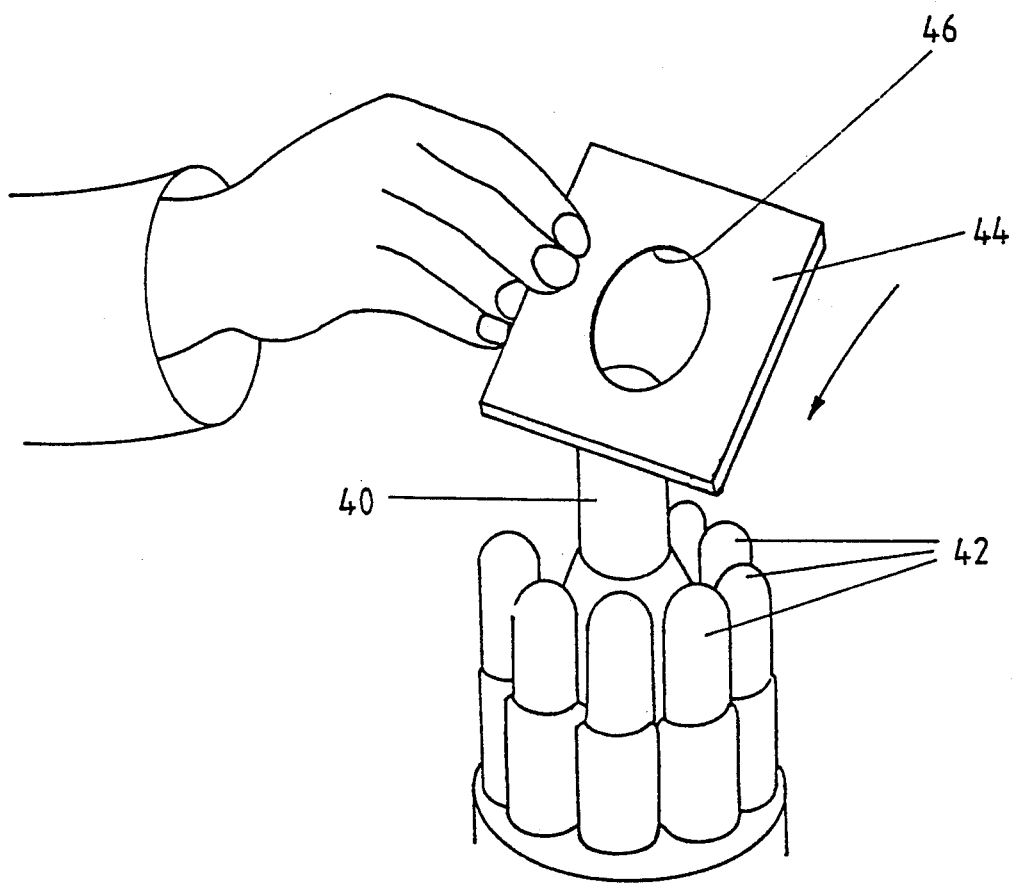
FIG. 4 is a view of an alternative form of heat shield being used when a longer, central entry port is being recovered.
Figure 5:
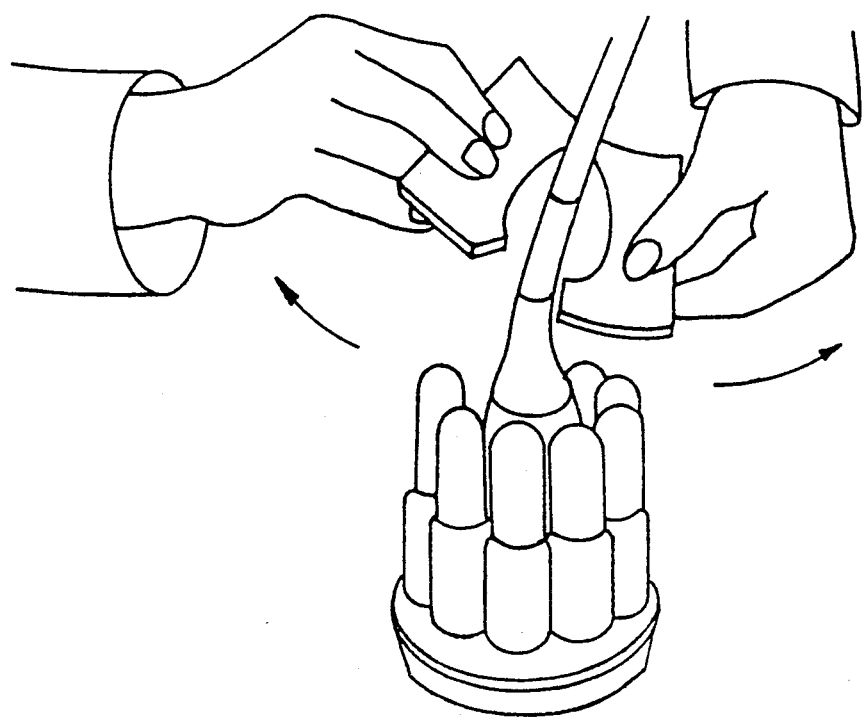
FIG. 5 is a view to show how the heat shield of FIG. 4 is removed subsequently.
Figure 6:
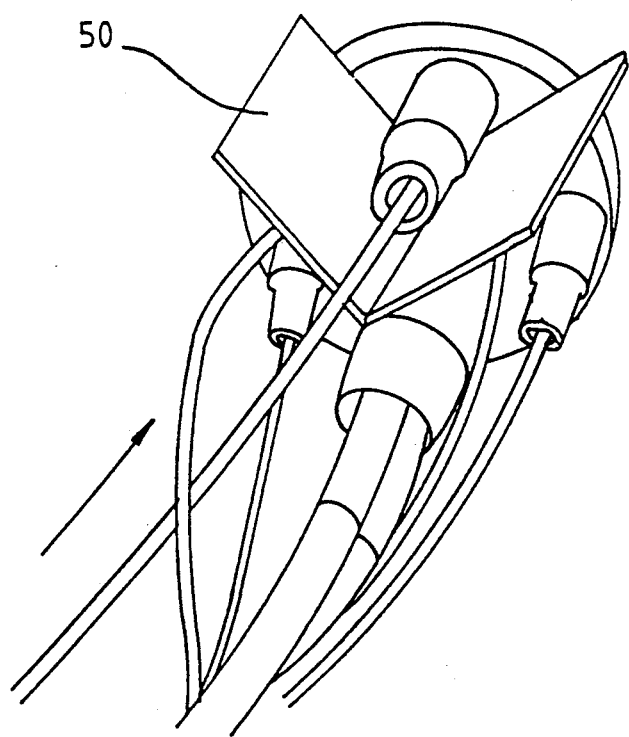
FIG. 6 is a view showing a V-shaped heat shield placed about an entry port which is to be recovered and shielding the other entry ports from the applied heat.

The joint closure kit may include the alternative forms of heat shield shown in FIGS. 4 to 6. In these FIGS. the joint closure base has a central entry port 40 which projects axially outwards further than the surrounding entry ports 42, and the central entry port 40 is of generally oval cross-section for receiving two cables side by side. A heat shield 44 comprises a flat piece of ceramic material with an oval aperture 46 therein, and this is placed over the central entry port so that the heat-shrinkable end portion of the latter projects through the aperture 46. Heat may then be applied to recover this portion of the entry port about the cables installed through it, the heatshield 44 insulating the other entry ports from this heat. The heat shield 44 is then removed by tearing it through from one edge to the aperture 46 as shown in FIG. 5. Subsequently individual ones of the entry ports 42 may be recovered about respective cables, with a heat shield 50 used to prevent the applied heat from reaching any of the other ports. Heat shield 50 is of V shape and is placed around the cable entry port which is to be recovered. The heat shield 50 comprises two pieces of the ceramic heat insulating material hinged together, by means for example of an aluminium foil backing.

I claim:

1. A base assembly for a cable splice closure, said base assembly comprising:
   a one-piece member of rigid construction, having a plurality of tubular projections extending thereon in a direction which is outwardly with respect to the cable splice closure when formed, said tubular projections forming cable entry ports, and frangible membranes closing the axially inner ends of the tubular projections; and
   a separate member having a plurality of tubular elements fitted closely around respective tubular projections of the one-piece member, the tubular elements having portions projecting beyond the free, axially outer ends of the respective tubular projections of the one-piece member, said projecting portions of the tubular elements being heat-shrinkable.

2. A cable splice closure base assembly as claimed in claim 1, wherein:
   the heat-shrinkable portion of each of said plurality of tubular elements is closed at its free, axially outer end.

3. A cable splice closure base assembly as claimed in claim 1, wherein:
   said one-piece rigid member is formed with a plurality of internal compartments in register with respective said tubular projections.

4. A cable splice closure base assembly as claimed in claim 2, wherein:
   said one-piece rigid member is formed with a plurality of internal compartments in register with respective said tubular projections.

5. A kit for forming a cable joint closure, the kit comprising: a base assembly having
   a one-piece member of rigid construction, having a plurality of tubular projections extending thereon in a direction which is outwardly with respect to the cable splice closure when formed, said tubular projections forming cable entry ports, and frangible membranes closing the axially inner ends of the tubular projections, and
   a separate member having a plurality of tubular element means for fitting closely around respective tubular projections of the one-piece member, the tubular element means having portions for projecting beyond the free, axially outer ends of the respective tubular projections of the one-piece member, said projecting portions of the tubular element means being heat-shrinkable; and
   at least one heat shield means for thermally insulating at least one said tubular element means from heat applied to heat shrink at least one other said tubular element means.

6. A kit as claimed in claim 5, wherein:
   one of said at least one heat shield means is of tubular form and fits over a said tubular element means.

7. A kit as claimed in claim 5, wherein:
   one of said heat shield means is of generally V-shape or C-shape for placing about a particular of said tubular element means which is to be heat shrunk and for shielding adjacent said tubular element means from heat to be applied to said particular tubular element means.

8. A kit as claimed in claim 5, wherein:
   one of said heat shield means comprises a material which fits over one particular said tubular element means, which particular tubular element means projects axially beyond the free ends of other said tubular element means, so that heat can be applied to said one particular tubular element means to heat shrink said particular tubular element means while insulating said other tubular element means from the applied heat.

9. A kit as claimed in claim 7, wherein:
   one of said heat shield means comprises a material which fits over one particular said tubular element means, which particular tubular element means projects axially beyond the free ends of other said tubular element means, so that heat can be applied to said one particular tubular element means to heat shrink said particular tubular element means while insulating said other tubular element means from the applied heat.

10. A method of forming a cable joint, comprising the steps of:
    a) furnishing a closure base assembly, said base assembly comprising
       a one-piece member of rigid construction, having a plurality of tubular projections extending thereon in a direction which is outwardly with respect to the cable splice closure when formed, said tubular projections forming cable entry ports, and frangible membranes closing the axially inner ends of the tubular projections, and a separate member having a plurality of tubular elements fitted closely around respective tubular projections of the one-piece member, the tubular elements having portions projecting beyond the free, axially outer ends of the respective tubular projections of the one-piece member, said projecting portions of the tubular elements being heat-shrinkable;

b) rupturing the frangible membrane of at least one particular tubular projection of the one-piece member of the closure base assembly;

c) passing a cable through said one particular tubular projection and the tubular element fitted over said particular tubular projection;

d) applying heat to the heat-shrinkable projecting portion of the tubular element fitted over said one particular tubular projection; and e) simultaneously with said step of applying heat, using at least one heat shield to insulate the other tubular elements of said separate member from the heat being applied to said heat-shrinkable projecting portion.

* * * * *